(12) United States Patent
Pan

(10) Patent No.: US 11,350,607 B2
(45) Date of Patent: Jun. 7, 2022

(54) LIFE JACKET FOR PET

(71) Applicant: Min Pan, Hangzhou (CN)

(72) Inventor: Min Pan, Hangzhou (CN)

( * ) Notice: Subject to any disclaimer, the term of this patent is extended or adjusted under 35 U.S.C. 154(b) by 432 days.

(21) Appl. No.: 16/691,617

(22) Filed: Nov. 22, 2019

(65) Prior Publication Data

US 2021/0153458 A1 May 27, 2021

(51) Int. Cl.
*A01K 13/00* (2006.01)

(52) U.S. Cl.
CPC .................................. *A01K 13/006* (2013.01)

(58) Field of Classification Search
CPC .. A01K 13/006; A01K 27/002; A01K 27/005; A01K 27/006; A01K 29/00; B63C 9/115; B63C 2009/084; B63C 9/11; B63C 9/20
See application file for complete search history.

(56) References Cited

U.S. PATENT DOCUMENTS

| | | | | |
|---|---|---|---|---|
| 5,632,235 | A * | 5/1997 | Larsen | A01K 27/006 119/858 |
| 5,894,817 | A * | 4/1999 | Manuel | A01K 27/002 119/497 |
| 5,996,537 | A * | 12/1999 | Caditz | A01K 13/008 54/79.1 |
| 7,052,345 | B1 * | 5/2006 | Rowan | B63C 9/1255 441/80 |
| 2003/0220031 | A1 * | 11/2003 | McCormick | A01K 13/006 441/88 |
| 2008/0227346 | A1 * | 9/2008 | Von Zell | A01K 13/006 441/129 |
| 2008/0276880 | A1 * | 11/2008 | Swisher | A01K 27/002 119/728 |
| 2010/0199927 | A1 * | 8/2010 | Cigard | A01K 13/00 119/850 |
| 2010/0240272 | A1 * | 9/2010 | Cosson | B63C 9/115 441/106 |
| 2011/0174237 | A1 * | 7/2011 | Sanders-Luckman | A01K 13/006 119/856 |
| 2014/0045395 | A1 * | 2/2014 | Cannici | B63C 9/115 441/89 |
| 2017/0305515 | A1 * | 10/2017 | Hansen | A01K 29/00 |
| 2019/0297851 | A1 * | 10/2019 | Nixon | A01K 27/002 |
| 2020/0404887 | A1 * | 12/2020 | Akenhead | A01K 13/006 |
| 2021/0009244 | A1 * | 1/2021 | Hansen | A01K 29/00 |

FOREIGN PATENT DOCUMENTS

KR 20170003868 U * 11/2017

* cited by examiner

*Primary Examiner* — Trinh T Nguyen
(74) *Attorney, Agent, or Firm* — Raymond Y. Chan; David and Raymond Patent Firm

(57) ABSTRACT

A pet life jacket includes a jacket body and a wearing mechanism. The jacket body includes a floatable back body, two floatable side wings sidewardly extended from the floatable back body, and two floatable collar arms frontwardly extended from the floatable back body. The wearing mechanism includes a belly lock provided at the floatable side wings and a collar lock provided at the floatable collar arms to form a floatable collar loop. The jacket body is adapted to be worn by a pet via the wearing mechanism at a position that the floatable back body is retained at a back of the pet, the floatable side wings are retained at two sides of the pet, and the floatable collar loop is encircled around a collar of the pet via the collar lock.

21 Claims, 9 Drawing Sheets

LIFE JACKET FOR PET

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a life vest, and more particularly to a life jacket for a pet, wherein the life jacket provides a simple wearing configuration and a great floating stability to support the pet in the water.

Description of Related Arts

A conventional pet life vest generally comprises a floatable back panel and a wearing device extended therefrom, wherein the wearing device comprises a collar strap and a belly strap, such that when the collar strap is extended around a chest of the pet and the belly strap is extended at a belly of the pet, the floatable back panel is located at the back of pet to provide a buoyancy to support the pet in the water. However, the conventional pet life vest has several drawbacks.

The conventional pet life vest is cumbersome because only the floatable back panel has floating ability. In other words, the size of the floatable back panel must be big enough to support the weight of the pet in the water. Furthermore, the wearing configuration has poor design for the pet wearing the floatable back panel. When the collar strap and the belly strap are tightly tied at the pet to secure the floatable back panel at the back of the pet, the pet is tied up by the collar strap and the belly strap to impede the movement in the water. During the tying operation, the pet hair, especially for the pet having long hairs, will also be tied and knotted with the wearing device, such that the pet hairs will be tangled with the collar strap and the belly strap. If the collar strap and the belly strap are loosely tied at the pet, the floatable back panel will be moved around the pet's body. As a result, the pet is uncomfortable when wearing the pet life vest and the pet life vest may be taken off accidentally. Furthermore, the conventional pet life vest cannot keep the head of the pet above the water because the collar strap does not have any floating ability. It is worth mentioning that an improve pet life vest comprises a floatable chest panel to replace the collar strap for providing an additional floating ability to the pet. However, it is difficult for the pet owner to put the pet life vest on the pet body. The pet is uncomfortable when the chest of the pet is covered by the chest panel.

SUMMARY OF THE PRESENT INVENTION

The invention is advantageous in that it provides a life jacket for a pet, wherein the life jacket, i.e. a pet flotation device, provides a simple wearing configuration and a great floating stability to support the pet in the water.

Another advantage of the invention is to provide a life jacket for a pet, wherein two floatable collar arms are detachably coupled with each other to form a floatable collar loop for encircling around the collar of the pet so as to keep the head of the pet above the water.

Another advantage of the invention is to provide a life jacket for a pet, wherein the size of the floatable collar loop is adjustable to fit the collar of the pet.

Another advantage of the invention is to provide a life jacket for a pet, wherein two belly flaps are detachably and overlappedly fastened with each other to form an adjustable belly loop with size adjusting ability for fittingly encircling the belly of the pet.

Another advantage of the invention is to provide a life jacket for a pet, which provides a double locking mechanism to secure the life jacket at the pet's body while the pet can wear it comfortably.

Another advantage of the invention is to provide a life jacket for a pet, wherein a reflective layer is provided at the jacket body and is located above the water when the pet floats in the water.

Another advantage of the invention is to provide a life jacket for a pet, wherein two floatable side wings are extended to two sides of the pet when wearing to support the pet in the water stably so as to keep the balance of the pet in the water.

Another advantage of the invention is to provide a life jacket for a pet, wherein a pet hair trapping prevention unit is provided for preventing pet hairs being trapped by the wearing mechanism when the life jacket is put on the pet.

Another advantage of the invention is to provide a life jacket for a pet, which does not require any complicated wearing structure, such that the pet owner can easily put on the life jacket for the pet.

Another advantage of the invention is to provide a life jacket for a pet, wherein no expensive or complicated structure is required to employ in the present invention in order to achieve the above mentioned objects. Therefore, the present invention successfully provides an economic and efficient solution for providing an effective tool to support the pet in the water.

Additional advantages and features of the invention will become apparent from the description which follows, and may be realized by means of the instrumentalities and combinations particular point out in the appended claims.

According to the present invention, the foregoing and other objects and advantages are attained by a life jacket for pet, which comprises a jacket body and a wearing mechanism.

The jacket body comprises a floatable back body, two floatable side wings sidewardly extended from the floatable back body, and two floatable collar arms frontwardly extended from the floatable back body.

The wearing mechanism comprises a belly lock provided at the floatable side wings and a collar lock provided at the floatable collar arms to form a floatable collar loop. The jacket body is adapted to be worn by a pet via the wearing mechanism at a position that the floatable back body is retained at a back of the pet, the floatable side wings are retained at two sides of the pet, and the floatable collar loop is encircled around a collar of the pet via the collar lock.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
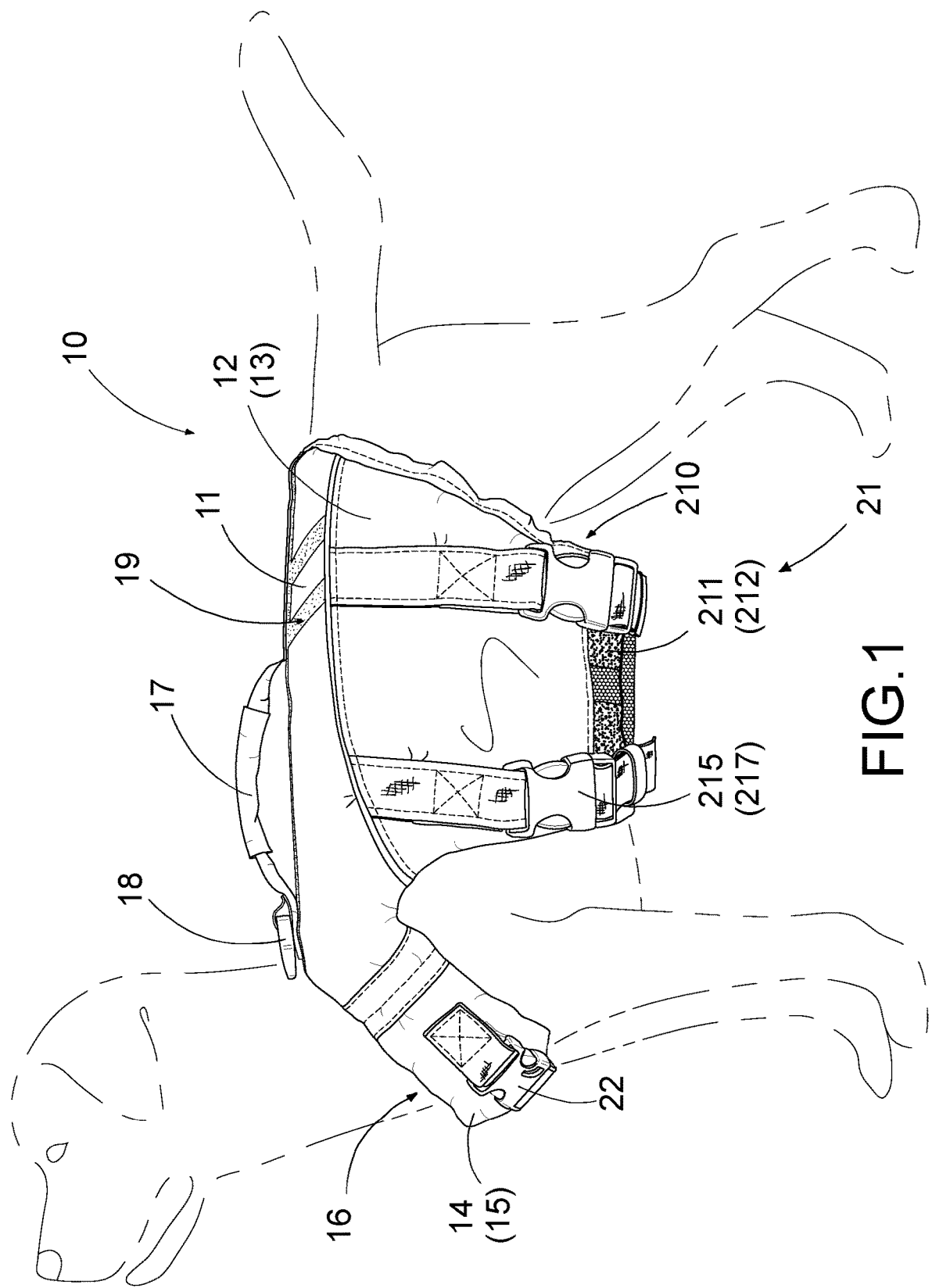
FIG. 1 illustrates a pet wearing a life jacket according to a preferred embodiment of the present invention.
Figure 2:
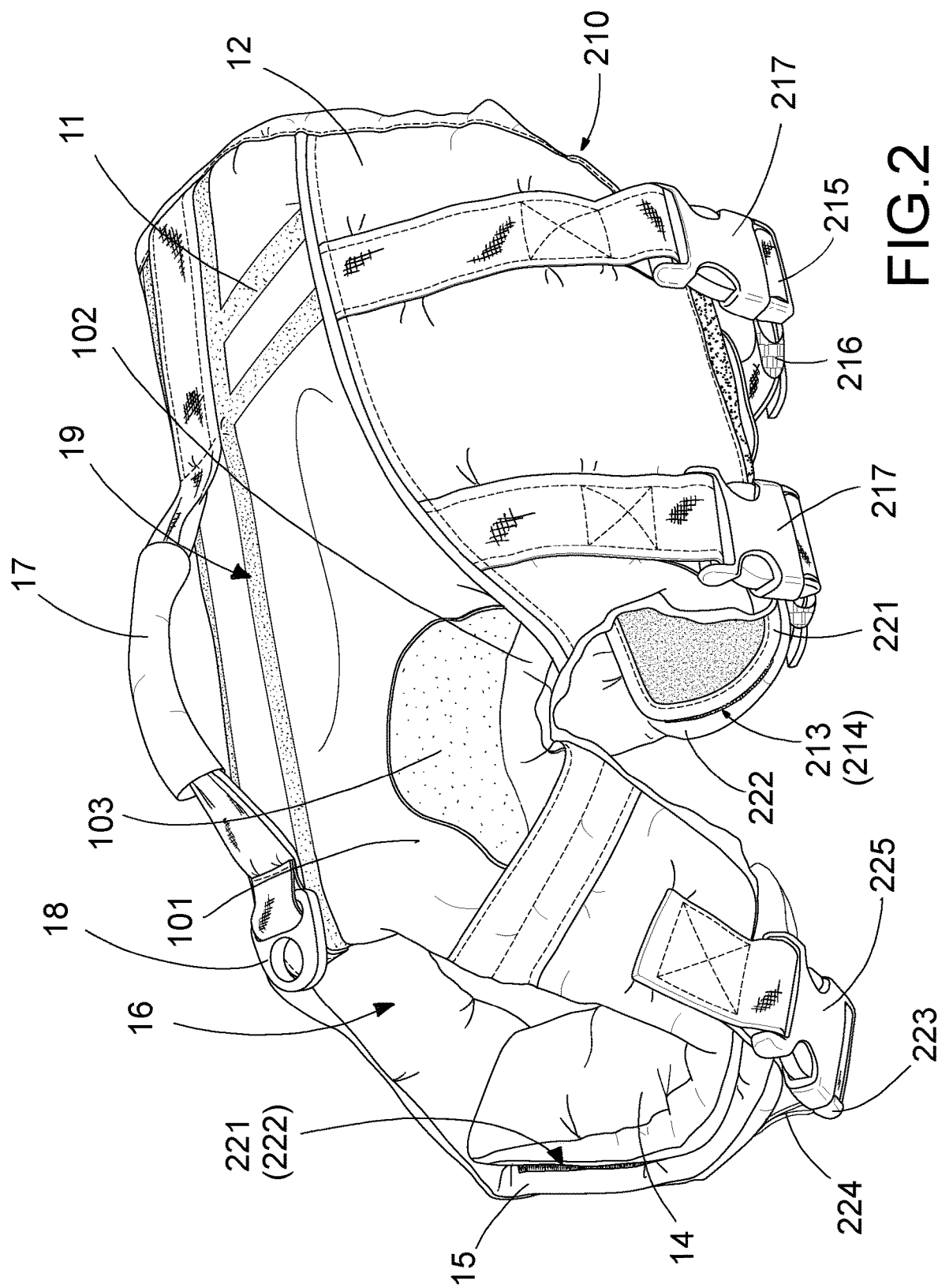
FIG. 2 is a perspective view of the life jacket according to the above preferred embodiment of the present invention.
Figure 3:
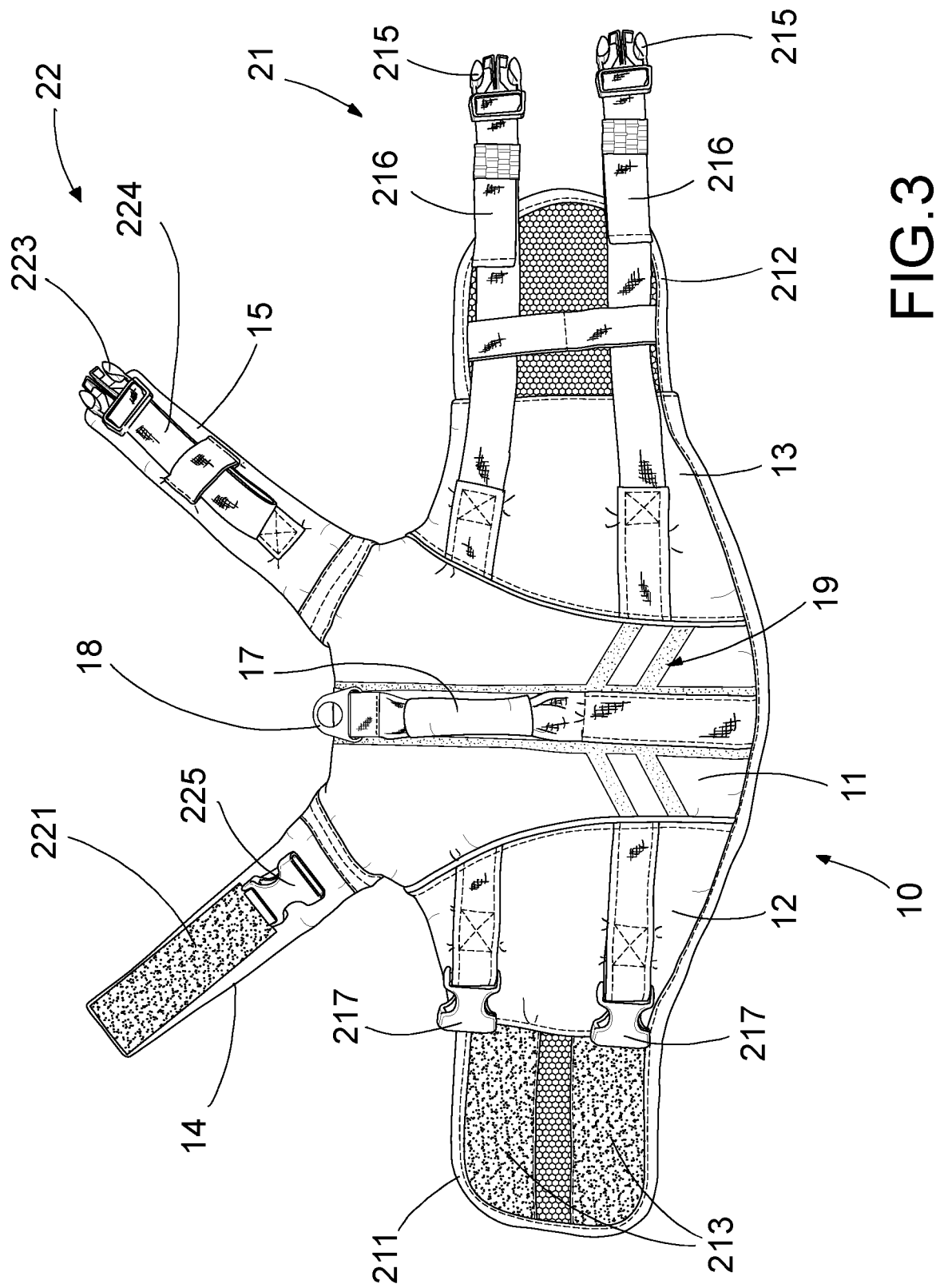
FIG. 3 is a top view of the life jacket in a lying flat condition according to the above preferred embodiment of the present invention.
Figure 4:
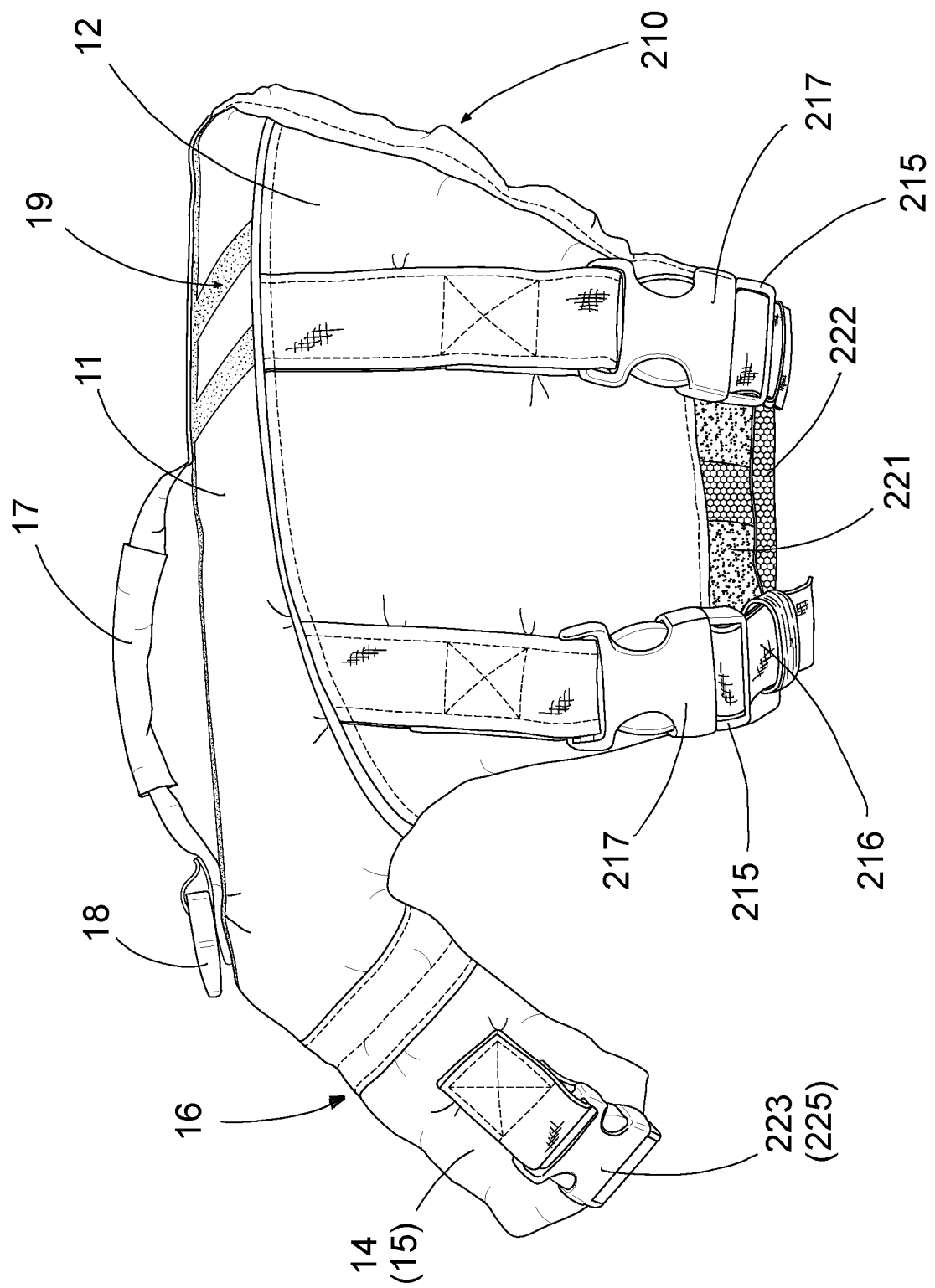
FIG. 4 is a side view of the life jacket according to the above preferred embodiment of the present invention.
Figure 5:
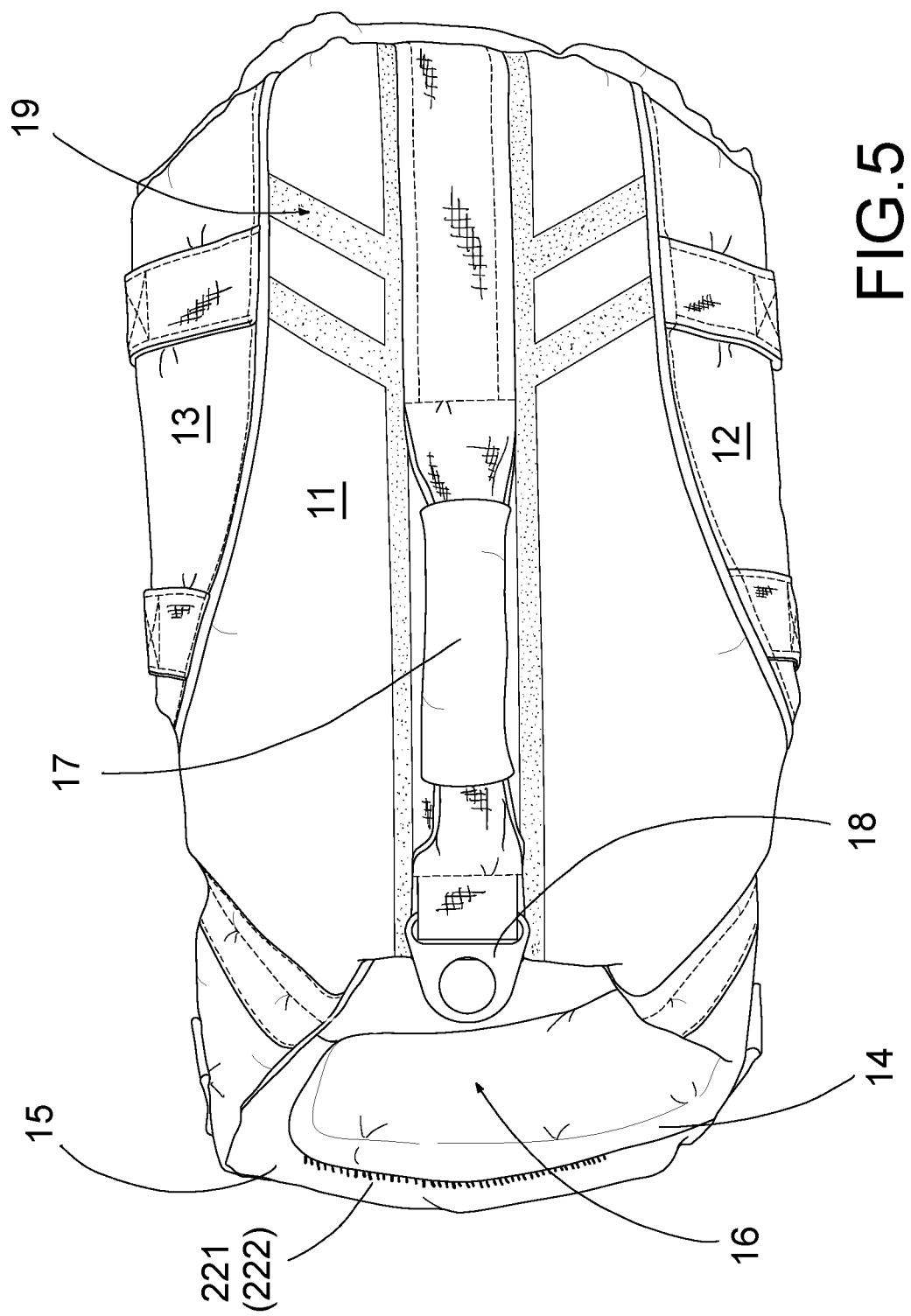
FIG. 5 is a top view of the life jacket according to the above preferred embodiment of the present invention.
Figure 6:
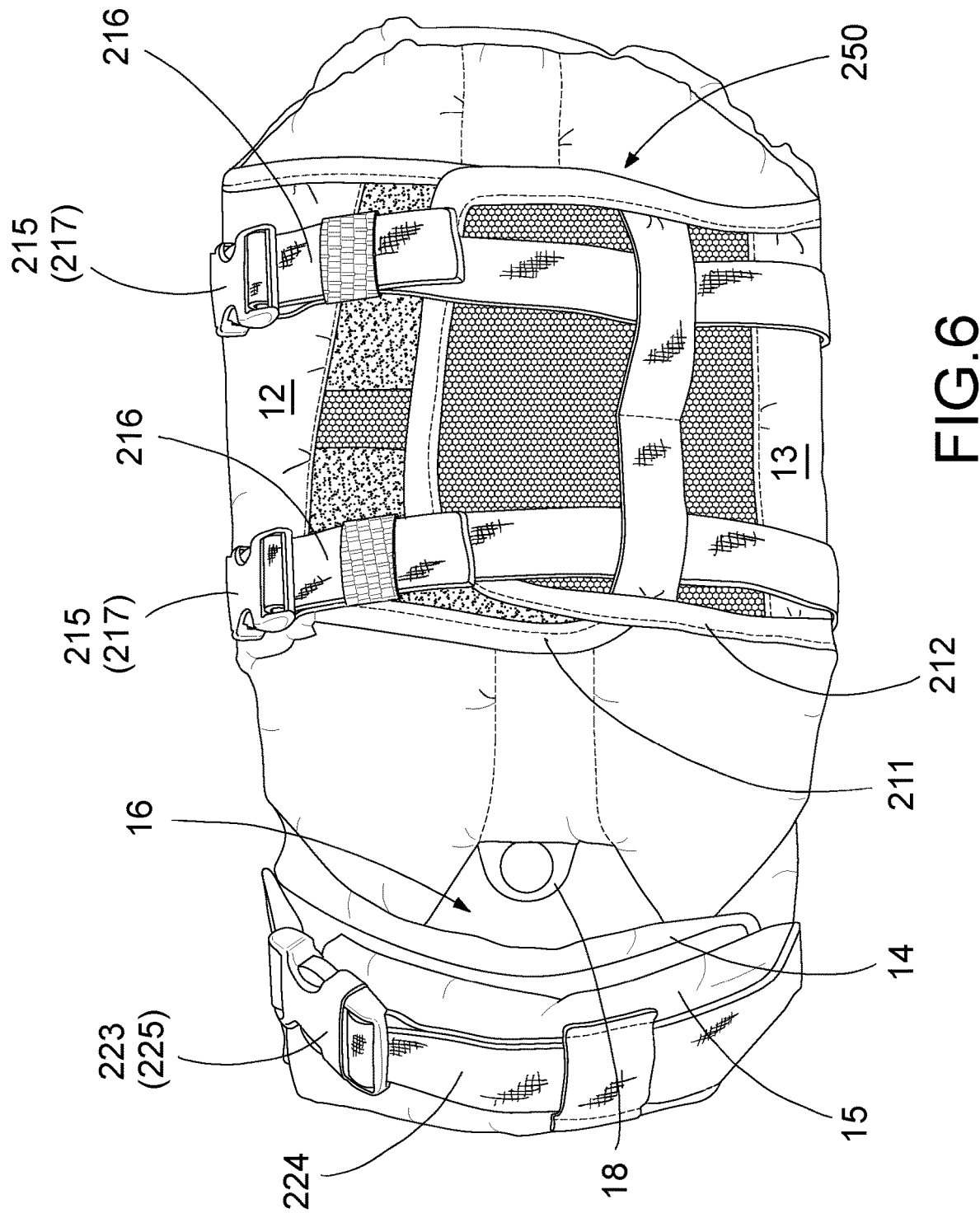
FIG. 6 is a bottom view of the life jacket according to the above preferred embodiment of the present invention.

Referring to FIGS. 1 to 3 of the drawings, a life jacket for a pet, such as a dog, according to a preferred embodiment of the present invention is illustrated. The pet life jacket comprises a jacket body 10 and a wearing mechanism 20, wherein the jacket body 10 is adapted to be worn by the pet via the wearing mechanism 20.

As shown in FIGS. 1 to 6, the jacket body 10 comprises a floatable back body 11, two floatable side wings 12, 13 sidewardly extended from the floatable back body 11, and two floatable collar arms 14, 15 frontwardly extended from the floatable back body 11. The floatable collar arms 14, 15 are detachably coupled with each other to form floatable collar loop 16 for encircling around a collar of the pet, such that the floatable collar arms 14, 15 form an inner floatable collar arm 14 and an outer floatable collar arm 15 respectively when the outer floatable collar arm 15 is overlapped with the inner floatable collar arm 14.

Accordingly, the floatable back body 11 has a length corresponding to a back of the pet, wherein the floatable back body 11 has two side edges and a front edge. The two floatable side wings 12, 13 are sidewardly extended from two side edges of the floatable back body 11 respectively. The two floatable collar arms 14, 15 frontwardly and spacedly extended from the front edge of the floatable back body 11. Preferably, the floatable side wings 12, 13, and the floatable collar arms 14, 15, are integrally extended from the floatable back body 11 to form a one piece integral wearable gear.

As shown in FIG. 2, the jacket body is constructed to have an outer jacket layer 101 and an inner jacket layer 102 to form a cavity, and a floatable element 103 received in the cavity between the outer and inner jacket layers 101, 102. Preferably, the floatable element 103 is made of foam material to provide a strong floating ability comparing to an air inflatable bladder. It is worth mentioning that the air inflatable bladder may be accidentally deflated, such as poking a hole by the pet claw. In other words, the floatable back body 11, the floatable side wings 12, 13 and the floatable collar arms 14, 15 are constructed to have the floatable element 103.

The jacket body 10 further comprises a handle strap 17 provided on the floatable back body 11, and a leash attachment 18, such as a leash loop, also provided on the floatable back body 11 for detachably coupling with a pet leash. The jacket body 10 further comprises a light reflective layer 19 provided on the floatable back body 11, such that the light reflective layer 19 is arranged for locating above the water when the pet floats in the water.

According to the preferred embodiment, the wearing mechanism 20 comprises a belly lock 21 provided at the floatable side wings 12, 13 and a collar lock 22 provided at the floatable collar arms 14, 15. When the jacket body 10 is worn, the floatable back body 11 is retained at a back of the pet and the floatable side wings 12, 13 are retained at two sides of the pet respectively via the belly lock 21. The floatable collar arms 14, 15 are detachably coupled with each other via the collar lock 22 to form the floatable collar loop 16 for encircling around the collar of the pet. It is worth mentioning that the floatable side wings 12, 13 are retained at two sides of the pet respectively to keep the balance of the pet when the pet floats in the water. The collar of the pet is encircled by the floatable collar loop 16 to keep the head of the pet above the water.

As shown in FIGS. 2 to 6, the belly lock 21 comprises two belly flaps 211, 212 extended from the floatable side wings 12, 13 respectively, wherein the two belly flaps 211, 212 forms an inner belly flap 211 and an outer belly flap 212 respectively being detachably overlapped with each other to form an adjustable belly loop 210 for encircling the belly of the pet. In other words, the outer belly flap 212 is overlapped with the inner belly flap 211 to form the adjustable belly loop 210.

The belly lock 21 further comprises first and second belly fasteners 213, 214 provided on the belly flaps 211, 212 respectively and arranged to detachably fastened with each other, wherein the belly flaps 211, 212 are detachably and overlappedly fastened with each other via the first and second belly fasteners 213, 214 to form the adjustable belly loop 210 for encircling the belly of the pet. In other words, the first belly fastener 213 is provided at an outer surface of the inner belly flap 211 while the second belly fastener 214 is provided at an inner surface of the outer belly flap 212. In one embodiment, the first and second belly fasteners 213, 214 are hook and loop fasteners respectively. It is worth mentioning the size of the adjustable belly loop 210 is adjustable via an overlapping portion of the belly flaps 211, 212. When the width of the overlapping portion of the belly flaps 211, 212 is increased, the size of the adjustable belly loop 210 is reduced. Likewise, when the width of the overlapping portion of the belly flaps 211, 212 is reduced, the size of the adjustable belly loop 210 is enlarged.

The belly lock 21 further comprises at least a belly strap unit extended from the floatable side wings 12, 13 for locking the jacket body 10 at the body of the pet. The belly strap unit comprises a first belly connector 215, a length-adjustable belly strap 216 having one end extended from one of the floatable side wings 13 and another end coupled at the first belly connector 215, and a second belly connector 217 provided at another floatable side wing 12 to detachably couple with the first belly connector 215 so as to retain the belly flaps 211, 212 on the belly of the pet.

Accordingly, the belly lock 21 provides a double belly lock mechanism, via the attachment between the belly flaps 211, 212, and the engagement of the belly strap unit, to secure the adjustable belly loop 210 so as to prevent any unwanted movement of the jacket body 10 with respect to the pet. After the outer belly flap 212 is fastened and overlapped with the inner belly flap 211 via the first and second belly fasteners 213, 214, the first belly connector 215 is then coupled to the second belly connector 217 to form the double belly lock mechanism. The length of the length-adjustable belly strap 216 is adjustable according to the size of the adjustable belly loop 210 to ensure the fitting engagement between the first and second belly connectors 215, 217. In one embodiment, two belly strap units are provided to secure the locking mechanism for the jacket body 10, wherein two spaced apart first belly connectors 215, two length-adjustable belly straps 216 in parallel manner, and two second belly connectors 217 are provided. Preferably, the first and second belly connectors 215, 217 are a buckle fastener and a buckle socket respectively.

According to the preferred embodiment, the collar lock 22 comprises first and second collar fasteners 221, 222 provided on the floatable collar arms 14, 15 respectively and arranged to detachably fastened with each other, such that the floatable collar arms 14, 15 are detachably and overlappedly fastened with each other to form the adjustable collar loop 16. Accordingly, the first collar fastener 221 is provided at an outer surface of the inner floatable collar arm 14 while the second collar fastener 222 is provided at an inner surface of the outer floatable collar arm 15, such that when the outer floatable collar arm 15 is overlapped and fastened with the inner floating chest arm 14 via the first and second collar fasteners 221, 222, the adjustable collar loop 16 is adjustably formed for encircling around the collar of the pet. In one embodiment, the first and second collar fasteners 221, 222 are hook and loop fasteners respectively. It is worth mentioning the size of the adjustable collar loop 16 is adjustable via an overlapping portion of the floatable collar arms 14, 15. When the width of the overlapping portion of the floatable collar arms 14, 15 is increased, the size of the adjustable collar loop 16 is reduced. Likewise, when the width of the overlapping portion of the floatable collar arms 14, 15 is reduced, the size of the adjustable collar loop 16 is enlarged.

The collar lock 22 further comprises at least a collar strap unit extended from the floatable collar arms 14, 15 for locking the jacket body 10 at the body of the pet. Accordingly, the collar strap unit comprises a first collar connector 223, a length-adjustable collar strap 224 having one end extended from one of the floatable collar arms 15 and another end coupled at the first collar connector 223, and a second collar connector 225 provided at another floatable collar arm 14 to detachably couple with the first collar connector 223 so as to lock up the adjustable collar loop 16 around the collar of the pet.

Accordingly, the collar lock 22 also provides a double collar lock mechanism, via the attachment between the floatable collar arms 14, 15, and the engagement of the collar strap unit, to secure the adjustable collar loop 16 so as to prevent any unwanted movement of the jacket body 10 with respect to the pet. After the outer collar arm 15 is fastened and overlapped with the inner collar arm 14 via the first and second collar fasteners 221, 222, the first collar connector 223 is then coupled to the second collar connector 225 to form the double collar lock mechanism. The length of the length-adjustable collar strap 224 is adjustable according to the size of the adjustable collar loop 16 to ensure the fitting engagement between the first and second collar connectors 223, 225. Preferably, the first and second collar connectors 223, 225 are a buckle fastener and a buckle socket respectively.

In order to put the life jacket on the pet, the floatable back body 11 is initially placed on the back of the pet. Then, the outer belly flap 212 is overlapped and fastened with the inner belly flap 211 via the first and second belly fasteners 213, 214 to form the adjustable belly loop 210 for encircling around the belly of the pet so as to retain the floatable side wings 12, 13 at two sides of the pet respectively. At the same time, the outer collar flap 15 is overlapped and fastened with the inner collar flap 14 via the first and second collar fasteners 221, 222 to form the adjustable collar loop 16 for encircling around the collar of the pet. Basically, the life jacket is put on the pet via the adjustably overlapping the belly flaps 211, 212 and the floatable side wings 12, 13. Then, the length of the length-adjustable belly strap 216 is adjusted according to the size of the adjustable belly loop 210 for the first and second belly connectors 215, 217 being engaged with each other. Correspondingly, the length of the length-adjustable collar strap 224 is adjusted according to the size of the adjustable collar loop 16 for the first and second collar connectors 223, 225 being engaged with each other. Then, the life jacket is securely worn by the pet.

Figure 7:
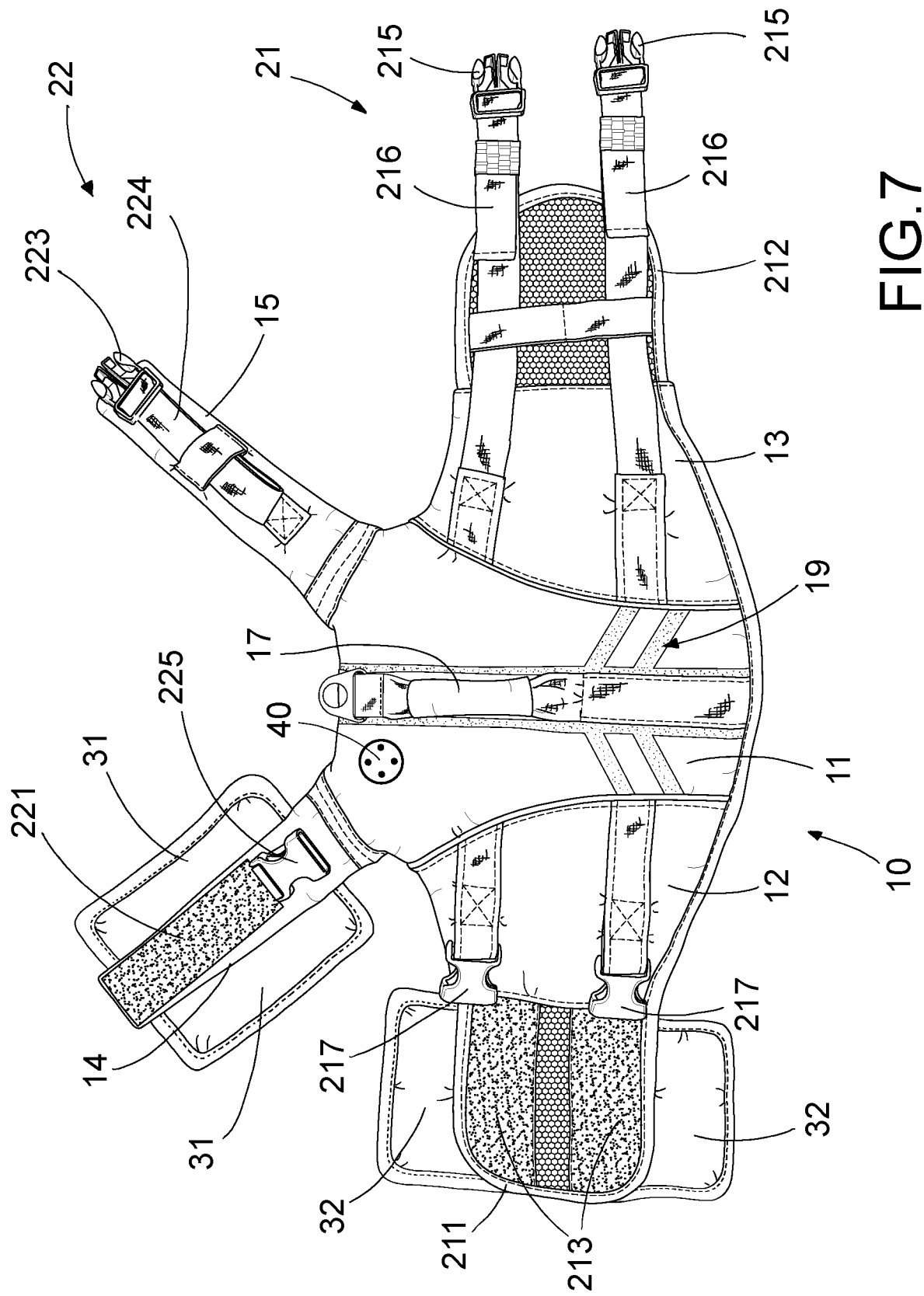
FIG. 7 illustrates an modification of the life jacket according to the above preferred embodiment of the present invention, illustrating a pet hair trapping prevention unit.
Figure 8:
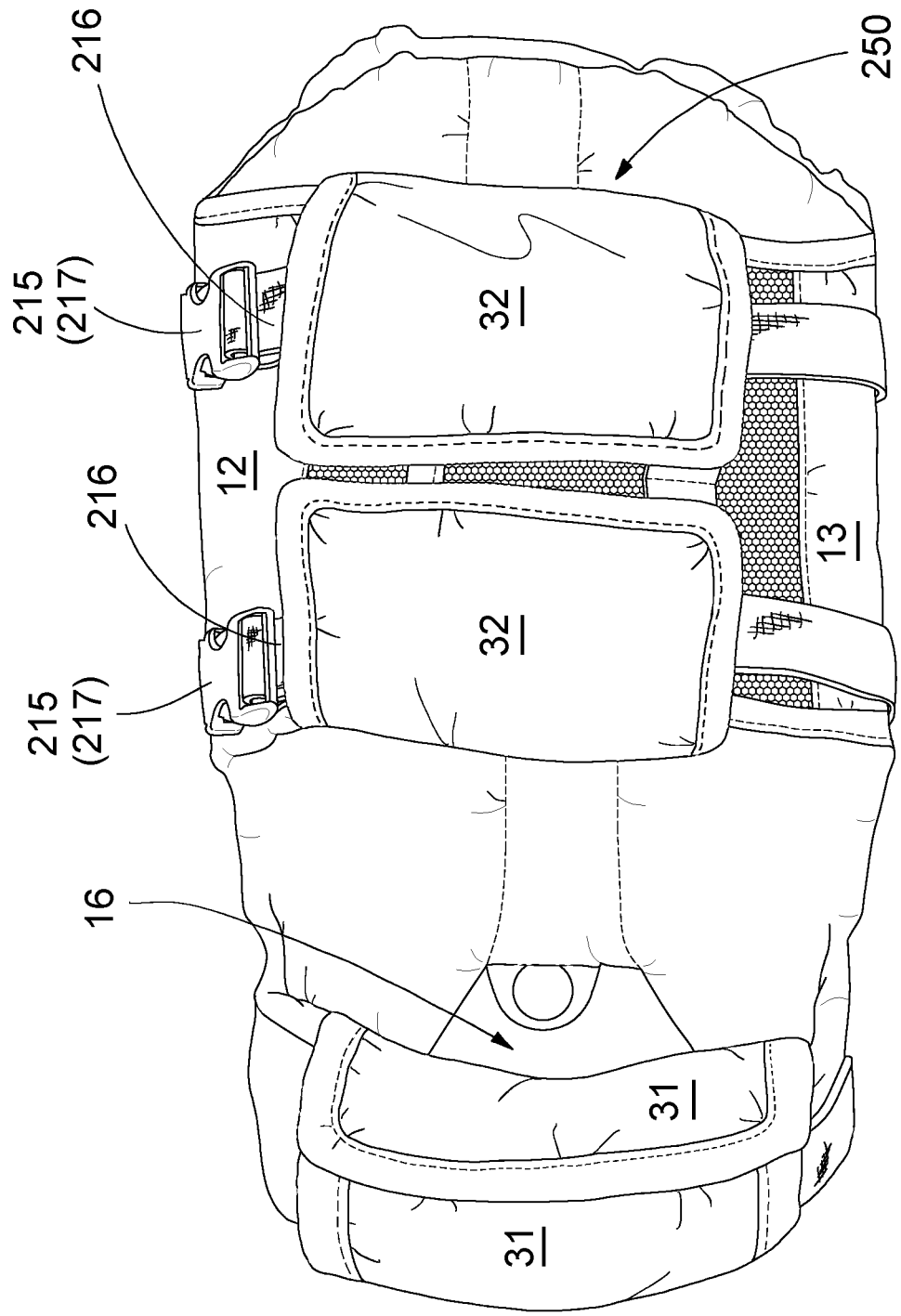
FIG. 8 illustrates the pet hair trapping prevention unit of the life jacket in a closed position according to the above preferred embodiment of the present invention.
Figure 9:
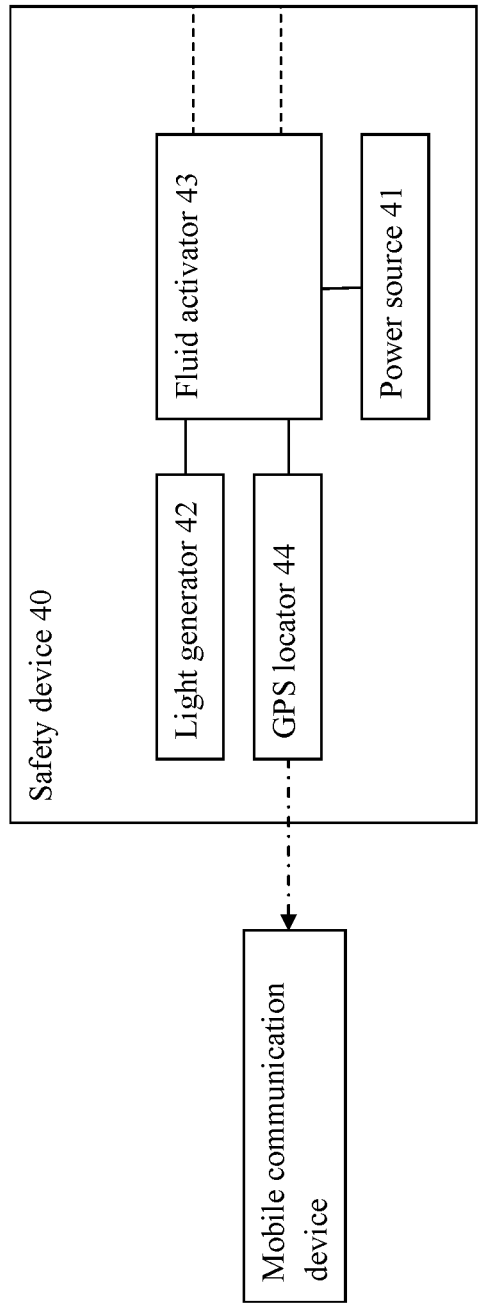
FIG. 9 is a block diagram of a safety device of the life jacket according to the above preferred embodiment of the present invention.

FIGS. 7 to 9 illustrate a modification of the life jacket of the present invention, wherein the modified life jacket in FIGS. 7 to 9 has the same structural configuration of the life jacket in FIGS. 1 to 6. As shown in FIGS. 7 and 8, the life jacket further comprises a pet hair trapping prevention unit 30 for preventing pet hairs being trapped by the wearing mechanism 20 during the wearing operation.

Accordingly, the pet hair trapping preventing unit 30 comprises two collar covering flaps 31 extended from two edges of one of the floatable collar arms 14 and arranged to outwardly fold on another floatable collar arm 15 when the floatable collar arms 14, 15 are overlapped with each other so as to cover and hide the collar lock 22. Preferably, the two collar covering flaps 31 are integrally extended from two side edges of the inner floating collar arm 14, wherein after the outer floating collar arm 15 is overlapped and fastened with the inner floating collar arm 14 to form the adjustable collar loop 16 and the first and second collar connectors 223, 225 are engaged with each other, the collar covering flaps 31 are overlapped folded on the outer floating collar arm 15. Therefore, the folded collar covering flaps 31 not only cover the side edges of the outer floatable collar 15 to cover an opening gap between the first and second collar fasteners 221, 222, but also cover the engagement between the first and second collar connectors 223, 225. As a result, the folded collar covering flaps 31 will prevent the pet hair being trapped between the first and second collar fasteners 221, 222 and between the first and second collar connectors 223, 225. It is worth mentioning that each of the collar covering flaps 31 has a predetermined width, wherein when the collar covering flaps 31 are folded on the floating collar arms 14, 15, the collar covering flaps 31 are overlapped with each other. The widths of the collar covering flaps 31 can be the same or different. It should be appreciated that, as an alternative, when the collar covering flaps 31 are folded on the floating collar arms 14, 15, the collar covering flaps 31 do not overlapped with each other.

The pet hair trapping preventing unit 30 further comprises two belly covering flaps 32 extended from two edges of the inner belly flap 211 and arranged to outwardly fold on the outer belly flap 212 when the outer belly flap 212 is overlapped on the inner belly flap 211 so as to cover and hide the belly lock 21.

Preferably, the two belly covering flaps 32 are integrally extended from two side edges of the inner belly flap 211, wherein after the outer belly flap 212 is overlapped and fastened with the inner belly flap 211 to form the adjustable belly loop 210 and the first and second belly connectors 215, 217 are engaged with each other, the belly covering flaps 32 are overlapped folded on the outer belly flap 212. Therefore, the folded belly covering flaps 32 will cover the side edges of the outer belly flap 212 to cover an opening gap between the first and second belly fasteners 213, 214. As a result, the folded belly covering flaps 32 will prevent the pet hair being trapped between the first and second belly fasteners 213, 214. It is worth mentioning that each of the belly covering flaps 32 has a predetermined width, wherein when the belly covering flaps 32 are folded on the belly flaps 211, 212, the belly covering flaps 32 do not overlapped with each other. The widths of the belly covering flaps 32 can be the same or different. It should be appreciated that, as an alternative, when the belly covering flaps 32 are folded on the belly flaps 211, 212, the belly covering flaps 32 are overlapped with each other.

As shown in FIGS. 7 and 9, the life jacket further comprises a safety device 40 provided on the jacket body 10. According the safety device 40 is coupled at the floatable back body 11 of the jacket body 10, such that the safety device 40 is located above the water when the pet floats in the water. The safety device 40 comprises a power source 41, a light generator 42 powered by the power source 41 for generating a light signal, and a fluid activator 43 adapted for being activated by fluid, such as water, to automatically switch on the light generator 42. In one embodiment, when the pet floats in the water for enabling the fluid activator 43 contacting with the water, the light generator 42 is activated by the fluid activator 43 to generate a flashing light effect as the light signal, to indicate the locate of the pet for the pet owner or other people. The safety device 40 further comprises a GPS locator 44 operatively connected to the power source 41 and the light activator 43 for generating a GPS locating signal. The GPS locator 44 is activated by the fluid activator 43 to generate the GPS locating signal, so as to allow people navigating the location of the pet. It is worth mentioning that the safety device 40 can be detachably attached onto the any location of the jacket body 10. In addition, the power source 41, the light generator 42, and the GPS locator 44 can be waterproof devices or housed in a waterproof casing, wherein one or more contacting terminals of the fluid activator 43 are exposed for contacting the water. The GPS locator 44 can be wirelessly connected to a mobile communication device, such as smartphone or Internet enabled device, such that the mobile communication device is able to receive the GPS signal from the GSP locator 44.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A life jacket for a pet, comprising:
a jacket body which comprises a floatable back body and two floatable side wings sidewardly extended from said floatable back body;
a wearing mechanism which comprises a belly lock comprising two belly flaps extended from said floatable side wings as inner and outer belly trap respectively for retaining said floatable back body at a back of the pet so as to retain said floatable side wings at two sides of the pet; and a pet hair trapping preventing unit for preventing pet hairs being trapped by said wearing mechanism, wherein said pet hair trapping preventing unit comprises two belly covering flaps extended from two edges of said inner belly flap and arranged to outwardly fold on said outer belly flap when said outer belly flap is overlapped on said inner belly flap so as to cover and hide said belly lock.

2. The life jacket, as recited in claim 1, wherein said belly lock comprises at least a belly strap unit extended from said floatable side wings for locking said jacket body at a body of the pet.

3. The life jacket, as recited in claim 2, wherein said belly lock further comprises first and second belly fasteners provided on said belly flaps respectively and arranged to detachably fastened with each other, such that said belly flaps are detachably and overlappedly fastened with each other to form an adjustable belly loop for encircling the belly of the pet.

4. The life jacket, as recited in claim 3, wherein said first and second belly fasteners are hook and loop fasteners respectively.

5. The life jacket, as recited in claim 3, wherein said belly strap unit comprises a first belly connector, a length-adjustable belly strap having one end extended from one of said floatable side wings and another end coupled at said first belly connector, and a second belly connector provided at another said floatable side wing to detachably couple with said first belly connector so as to retain said belly flaps on the belly of the pet.

6. The life jacket, as recited in claim 5, wherein said first and second belly connectors are a buckle fastener and a buckle socket respectively.

7. The life jacket, as recited in claim 1, wherein said jacket body further comprises two floatable collar arms frontwardly extended from said floatable back body and said wearing mechanism further comprises a collar lock provided at said floatable collar arm to form a floatable collar loop for encircling around a collar of the pet, wherein said collar lock comprises first and second collar fasteners provided on said floatable collar arms respectively and arranged to detachably fastened with each other, such that said floatable collar arms are detachably and overlappedly fastened with each other to form said adjustable collar loop.

8. The life jacket, as recited in claim 5, wherein said jacket body further comprises two floatable collar arms frontwardly extended from said floatable back body and said wearing mechanism further comprises a collar lock provided at said floatable collar arm to form a floatable collar loop for encirculing around a collar of the pet, wherein said collar lock comprises first and second collar fasteners provided on said floatable collar arms respectively and arranged to detachably fastened with each other, such that said floatable collar arms are detachably and overlappedly fastened with each other to form said adjustable collar loop.

9. The life jacket, as recited in claim 7, wherein said first and second collar fasteners are hook and loop fasteners respectively.

10. The life jacket, as recited in claim 7, wherein said collar lock further comprises a first collar connector, a length-adjustable collar strap having one end extended from one of said floatable collar arms and another end coupled at said first collar connector, and a second collar connector provided at another said floatable collar arm to detachably couple with said first collar connector so as to lock up said adjustable collar loop around the collar of the pet.

11. The life jacket, as recited in claim 8, wherein said collar lock further comprises a first collar connector, a length-adjustable collar strap having one end extended from one of said floatable collar arms and another end coupled at said first collar connector, and a second collar connector provided at another said floatable collar arm to detachably couple with said first collar connector so as to lock up said adjustable collar loop around the collar of the pet.

12. The life jacket, as recited in claim 10, wherein said first and second collar connectors are a buckle fastener and a buckle socket respectively.

13. The life jacket, as recited in claim 1, wherein said jacket body further comprises two floatable collar arms frontwardly extended from said floatable back body, wherein said floatable side wings and said floatable collar arms are integrally extended from said floatable back body.

14. The life jacket, as recited in claim 1, wherein said jacket body is constructed to have an outer jacket layer and an inner jacket layer to form a cavity, and a floatable element received in said cavity.

15. The life jacket, as recited in claim 14, wherein said floatable element is made of foam material.

16. The life jacket, as recited in claim 1, wherein said jacket body further comprises a light reflective layer provided on said floatable back body, such that said light reflective layer is arranged for locating above the water when the pet floats in the water.

17. The life jacket, as recited in claim 1, wherein said jacket body further comprises a handle strap provided on said floatable back body.

18. The life jacket, as recited in claim 1, wherein said jacket body further comprises two floatable collar arms frontwardly extended from said floatable back body and said wearing mechanism further comprises a collar lock provided at said floatable collar arm to form a floatable collar loop for encircling around a collar of the pet, wherein said pet hair trapping preventing unit comprises two collar covering flaps extended from two edges of one of said floatable collar arms and arranged to outwardly fold on another said floatable collar arm when said floatable collar arms are overlapped with each other so as to cover and hide said collar lock.

19. The life jacket, as recited in claim 7, wherein said pet hair trapping preventing unit comprises two collar covering flaps extended from two edges of one of said floatable collar arms and arranged to outwardly fold on another said floatable collar arm when said floatable collar arms are overlapped with each other so as to cover and hide said collar lock.

20. The life jacket, as recited in claim 1, further comprising a safety device provided on said jacket body, wherein said safety device comprises a power source, a light generator powered by said power source for generating a light signal, and a fluid activator adapted for being activated in contact with fluid in order to automatically switch on said light generator.

21. The life jacket, as recited in claim 20, wherein said safety device further comprises a GPS locator operatively connected to said power source and activated by said light activator for generating a GPS locating signal.

* * * * *